(12) United States Patent
Holden et al.

(10) Patent No.: US 8,994,486 B2
(45) Date of Patent: Mar. 31, 2015

(54) ELECTROMAGNETIC COIL ASSEMBLIES INCLUDING DISPARATE WIRE SPLICE CONNECTORS, DISPARATE WIRE SPLICE CONNECTORS, AND ASSOCIATED METHODS

(75) Inventors: Gene Holden, Scottsdale, AZ (US); Jacob Harding, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 154 days.

(21) Appl. No.: 13/493,879

(22) Filed: Jun. 11, 2012

(65) Prior Publication Data
US 2013/0082809 A1    Apr. 4, 2013

Related U.S. Application Data

(63) Continuation-in-part of application No. 13/251,902, filed on Oct. 3, 2011, now Pat. No. 8,205,786.

(51) Int. Cl.
| | |
|---|---|
| H01F 27/28 | (2006.01) |
| B23K 1/00 | (2006.01) |
| B23K 1/19 | (2006.01) |
| H01F 5/04 | (2006.01) |
| H01R 4/02 | (2006.01) |
| H01R 4/70 | (2006.01) |
| H01R 43/02 | (2006.01) |

(52) U.S. Cl.
CPC .............. *H01R 4/022* (2013.01); *B23K 1/0016* (2013.01); *B23K 1/19* (2013.01); *B23K 2203/10* (2013.01); *H01F 5/04* (2013.01); *H01R 4/70* (2013.01); *H01R 43/02* (2013.01)
USPC ....................................................... 336/192

(58) Field of Classification Search
USPC .......................... 336/65, 83, 107, 192, 90, 96
See application file for complete search history.

(56) References Cited

U.S. PATENT DOCUMENTS

| | | | |
|---|---|---|---|
| 355,611 A | 1/1887 | Howson | |
| 934,711 A | 9/1909 | Chapman | |
| 1,662,945 A | 3/1928 | Wielage | |
| 2,838,593 A | 6/1958 | Scesa et al. | |
| 2,864,929 A * | 12/1958 | Schwing | 219/523 |
| 3,955,741 A | 5/1976 | Hofer | |
| 4,057,187 A * | 11/1977 | Cranston et al. | 228/107 |
| 4,089,453 A | 5/1978 | Jenkins | |
| 4,214,121 A | 7/1980 | Charneski et al. | |
| 4,634,213 A | 1/1987 | Larsson et al. | |
| 4,829,146 A * | 5/1989 | Duve | 174/94 R |
| 4,889,506 A | 12/1989 | Connolly et al. | |
| 4,914,267 A | 4/1990 | Derbyshire | |

* cited by examiner

*Primary Examiner* — Tuyen Nguyen
(74) *Attorney, Agent, or Firm* — Ingrassia Fisher & Lorenz, P.C.

(57) ABSTRACT

Embodiments of a method are provided for joining a secondary wire to a magnet wire, such as a fine gauge aluminum or silver wire. Further provided are embodiments of a disparate wire splice connector and embodiments of an electromagnetic coil assembly including such a splice connector. In one embodiment, the electromagnetic coil assembly includes disparate wire splice connector having a first blind bore and a second blind bore. A coiled magnet wire having a segment inserted into the first blind bore is soldered to the disparate wire splice connector. A secondary wire having a segment inserted into the second blind bore is also soldered to the disparate wire splice connector such that the secondary wire is electrically coupled to the coiled magnet wire through the disparate wire splice connector.

20 Claims, 3 Drawing Sheets

ELECTROMAGNETIC COIL ASSEMBLIES INCLUDING DISPARATE WIRE SPLICE CONNECTORS, DISPARATE WIRE SPLICE CONNECTORS, AND ASSOCIATED METHODS

CROSS-REFERENCE TO RELATED APPLICATION

This application is a continuation-in-part of co-pending U.S. application Ser. No. 13/251,902, filed Oct. 3, 2011.

TECHNICAL FIELD

The present invention relates generally to coiled-wire devices and, more particularly, to electromagnetic coil assemblies including disparate wire splice connectors, as well as to methods for joining disparate wires utilizing specialized splice connectors.

BACKGROUND

There is an ongoing demand in the aerospace industry for low cost electromagnetic coils suitable for usage in coiled-wire devices, such as actuators (e.g., solenoids and motors) and sensors (e.g., rotary and linear variable differential transformers), capable of providing prolonged and reliable operation in high temperature environments and, specifically, while subjected to temperatures in excess of 260° C. It is known that low cost electromagnetic coils can be produced utilizing aluminum wire, which is commercially available at minimal cost, which provides suitable conductive properties, and which can be anodized to form an insulative alumina shell over the wire's outer surface. Aluminum wire is, however, highly susceptible to working hardening and mechanical fatigue during physical manipulation, especially if the aluminum wire is of a relatively fine gauge; e.g., 30-38 American Wire Gauge. Work hardening of the aluminum wire may result in breakage of the wire during assembly and/or termination, including termination to wires of differing diameters and material types. Work hardening may accelerate open circuit failure during subsequent device operation. Thus, to reduce the application of stress to a relatively fine gauge aluminum wire during manufacture of an electromagnetic coil assembly, it may be desirable to splice each end of the aluminum wire to a different wire less susceptible to work hardening and breakage.

Crimping has long been utilized to electrically and mechanically join wires together. Crimping of the fine gauge aluminum wire can, however, result in work hardening of the aluminum wire of the type described above. In addition, for instances wherein the aluminum wire is crimped to a second wire fabricated from a metal having a hardness exceeding that of aluminum, the deformation induced by crimping may be largely concentrated in the aluminum wire and an optimal physical mechanical and/or electrical bond may not be achieved. In contrast to crimping, soldering does not require the application of deformation forces to the wire-to-wire interface, which can cause the above-noted issues with fine gauge aluminum wire. However, soldering of fine gauge aluminum wire also presents certain difficulties. Due to its relatively low melt point and thermal mass, fine gauge aluminum wire can easily be overheated and destroyed during the solder processing. The likelihood of inadvertently overheating the aluminum wire is especially pronounced when soldering is carried-out in a relatively confined space utilizing, for example, a microtorch. Heating during soldering can also result in formation of oxides along the wires' outer surfaces increasing electrical resistance across the solder joint. As a still further drawback, moisture present at the solder interface can accelerate corrosion and eventual connection failure when aluminum wire is joined to a secondary wire formed from a metal, such as copper, having an electronegative potential that differs significantly as compared to aluminum wire.

It would thus be desirable to provide methods and means for reliably soldering aluminum wire, especially fine gauge aluminum wire, to a secondary wire that avoids the above-noted limitations associated with conventional soldering processes. Ideally, such a soldering method and means would facilitate the formation of a wire-to-wire solder connection having a relatively low ohmic resistance and a relatively high corrosion resistance. It would also be desirable for such an aluminum wire soldering method and means to be usefully applied in the production of electromagnetic coil assemblies, such as high temperature electromagnetic coil assemblies included within coiled-wire devices (e.g., actuators and sensors) deployed onboard aircraft. It would still further be desirable if such methods and means could also be utilized to join non-aluminum magnet wires, such as silver magnet wires, to disparate or dissimilar wires utilizing a solder-type connection. Other desirable features and characteristics of the present invention will become apparent from the subsequent Detailed Description and the appended Claims, taken in conjunction with the accompanying Drawings and the foregoing Background.

BRIEF SUMMARY

Embodiments of method are provided including the steps of providing a splice connector having a first blind bore and a second blind bore, inserting a segment of a coiled magnet wire into the first blind bore, and inserting a segment of the secondary wire into the second blind bore. The splice connector is soldered to these wire segments to electrically couple the coiled magnet wire and the secondary wire through the splice connector.

Embodiments of a disparate wire splice connector are further provided. In one embodiment, the disparate wire splice connector includes a generally cylindrical body, a first blind bore formed within a first end portion of the generally cylindrical body, a second blind bore formed within a second end portion of the generally cylindrical body, and a partitioning wall separating the first blind bore and the second blind bore. Solder material is disposed within the first blind bore and formulated for usage in conjunction with aluminum wire.

Embodiments of an electromagnetic coil assembly are still further provided. In one embodiment, the electromagnetic coil assembly includes a coiled magnet wire, a secondary wire, and an disparate wire splice connector. The disparate wire splice connector has a first blind bore into which a segment of the coiled magnet wire is inserted, as well as a second blind bore into which a segment of the secondary wire is inserted. A first solder material fills at least a portion of the first blind bore to electrically couple the coiled magnet wire to the splice connector, and a second solder material fills at least a portion of the second blind bore to electrically coupling the secondary wire to the splice connector and, therefore, to the coiled magnet wire.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes exemplary embodiments of a method for joining a magnet wire to a secondary wire, such as a lead wire or the conductor of a feedthrough structure, utilizing a specialized splice connector. The method described herein is especially useful for joining fine gauge aluminum wire, which is prone to mechanical fatigue and work hardening, to a secondary wire less susceptible to such issues. This notwithstanding, the method described herein can be utilized to join secondary wires (the term "wire" encompassing any electrical conductor) to various different types of magnet wires including fine gauge silver magnet wire. The secondary wire can be fabricated from one or more metals (e.g., copper, nickel, or silver) relatively resistant to mechanical fatigue and work hardening. Additionally or alternatively, the secondary wire may have a lower gauge (larger diameter) as compared to the magnet wire. As a still further possibility, the secondary wire may be a wire braid; that is, a plurality of conductive filaments interwoven into a braided cylinder, tube, or flattened ribbon. Embodiments of the below-described disparate wire solder method may be carried-out in the context of a larger fabrication process utilized to produce an electromagnetic coil assembly. Embodiments of the wire solder method and splice connector are especially useful in the production of high temperature electromagnetic coil assemblies, which can be employed within various different types of high temperature actuators (e.g., motors solenoids) and high temperature sensors (e.g., rotary and linear variable differential transformers). For this reason, an exemplary wire solder method and an exemplary wire-to-wire splice connector are described below in the context of high temperature electromagnetic coil assemblies; however, is it emphasized that embodiments of the solder method and splice connector described herein are by no means limited to application within electromagnetic coil assemblies and can be advantageously utilized in any application or platform wherein it is desired to form a soldered connection between disparate or dissimilar wires, such an aluminum or silver magnet wire and a secondary wire.

Figure 1:
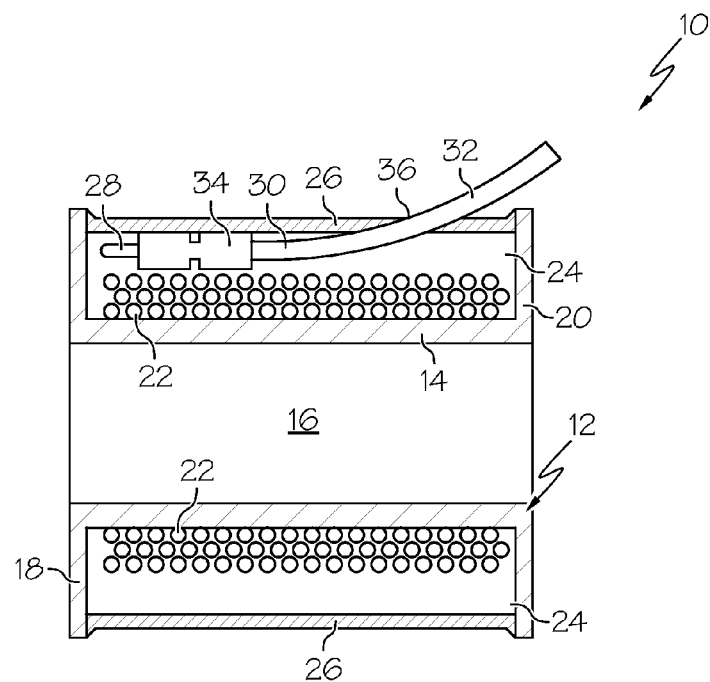
FIG. 1 is a simplified cross-sectional view of an electromagnetic coil assembly illustrated in accordance with an exemplary embodiment of the present invention.

FIG. 1 is a cross-sectional view of an electromagnetic coil assembly 10 illustrated in accordance with an exemplary embodiment of the present invention. Electromagnetic coil assembly 10 is suitable for usage within high temperature operating environments characterized by temperatures exceeding the threshold at which organic materials breakdown and decompose (approximately 260° C.) and, in preferred embodiments, characterized by temperatures approaching or exceeding 400° C. In view of its high temperature capabilities, electromagnetic coil assembly 10 is well-suited for usage in high temperature coiled-wire devices, such as those utilized in avionic applications. More specifically, and by way of non-limiting example, embodiments of high temperature electromagnetic coil assembly 10 are well-suited for usage within actuators (e.g., solenoids and motors) and position sensors (e.g., variable differential transformers and two position sensors) deployed onboard aircraft. This notwithstanding, it will be appreciated that embodiments of electromagnetic coil assembly 10 can be employed in any coiled-wire device, regardless of the particular form assumed by the coiled-wire device or the particular application in which the coiled-wire device is utilized.

Electromagnetic coil assembly 10 includes a support structure around which at least one magnet wire is wound to produce one or more electromagnetic coils. In the illustrated example, the support structure assumes the form of a hollow spool or bobbin 12 having an elongated tubular body 14, a central channel 16 extending through tubular body 14, and first and second flanges 18 and 20 extending radially outward from opposing ends of body 14. In embodiments wherein electromagnetic coil assembly 10 is incorporated into a sensor, such as an LVDT, bobbin 12 is preferably fabricated from a substantially non-ferromagnetic material, such as aluminum, a non-ferromagnetic 300 series stainless steel, or a ceramic. However, in embodiments wherein assembly 10 is incorporated into a solenoid, a motor, or the like, either a ferromagnetic or non-ferromagnetic material may be utilized to produce bobbin 12. Although not shown in FIG. 1 for clarity, an insulative shell may be formed over or an outer insulative coating may be deposited over the outer surface of bobbin 12 to provide electrical insulation between wire coil 22 (described below) and bobbin 12. For example, in embodiments wherein bobbin 12 is fabricated from a stainless steel, bobbin 12 may be coated with an outer dielectric material utilizing, for example, a brushing or spraying process; e.g., a glass may be brushed onto bobbin 12 as a paste or paint, dried, and then fired to form an electrically-insulative coating over selected areas of bobbin 12. As a second example, in embodiments wherein electromagnetic coil assembly 10 is disposed within an airtight or at least a liquid-tight package, such as a hermetic canister of the type described below in conjunction with FIGS. 5 and 6, an electrically-insulative inorganic cement of the type described below may be applied over the outer surfaces of bobbin 12 and cured to produce the electrically-insulative coating and thereby provide a breakdown voltage standoff. As a still further possibility, in embodiments wherein bobbin 12 is fabricated from aluminum, bobbin 12 may be anodized to form an insulative alumina shell over the bobbin's outer surface.

At least one magnet wire is wound around bobbin 12 to form one or more electromagnetic coils. In the illustrated example, a single magnet wire is wound around tubular body 14 of bobbin 12 to produce a multi-turn, multi-layer coiled magnet wire 22. In one group of embodiments, the magnet wire is preferably fabricated at least partially from aluminum and will consequently be primarily referred to as an "aluminum magnet wire" herein below; it is emphasized, however, that other types of magnet wires can also be employed, including silver magnet wires. Advantageously, aluminum wire provides excellent conductivity enabling the dimensions and overall weight of high temperature electromagnetic coil assembly 10 to be reduced, which is especially desirable in the context of avionic applications. As a further advantage, aluminum wire is readily commercially available at minimal cost. Regardless of the particular material or materials from which magnet wire 22 is fabricated, magnet wire 22 is preferably a high temperature wire; that is, a wire capable of usage at temperatures exceeding 260° C. without melting or other structural compromise. Winding of the magnet wire around bobbin 12 to produce the electromagnetic coil or coils can be carried-out utilizing a conventional wire winding machine. Coiled magnet wire 22 is preferably formed from a magnet wire having a relatively fine gauge; e.g., in many embodiments, the magnet wire (e.g., the aluminum or silver magnet wire) from which the electromagnetic coil or coils are formed will have a wire gauge of approximately 30-38 American Wire Gauge ("AWG"). If desired, the magnet wire utilized to form the electromagnetic coils may be anodized to provide additional electrical insulation between neighboring turns of coiled magnet wire 22 and between wire 22 and bobbin 12 to further reduce the likelihood of shorting and breakdown voltage during operation of electromagnetic coil assembly 10.

An electrically-insulative inorganic body 24 is deposited around tubular body 14 and between flanges 18 and 20 of bobbin 12. That is, the annular volume of space defined by the outer circumferential surface of tubular body 14 and the inner radial faces of flanges 18 and 20 is at least partially potted with an inorganic dielectric material or medium to form electrically-insulative body 24. Coiled magnet wire 22 is at least partially encapsulated within electrically-insulative body 24 and, preferably, wholly embedded therein. Electrically-insulative body 24 provides mechanical isolation, position holding, and electrical insulation between neighboring turns of coiled magnet wire 22 through the operative temperature range of the electromagnetic coil assembly 10. Electrically-insulative inorganic body 24 is preferably formed from a ceramic medium or material; i.e., an inorganic and non-metallic material, whether crystalline or amorphous. In embodiments wherein coiled magnet wire 22 is fabricated from aluminum, electrically-insulative inorganic body 24 is preferably formed from a material having a coefficient of thermal expansion ("CTE") approaching that of aluminum (approximately 23 parts per million per degree Celsius), but preferably not exceeding the CTE of aluminum, to minimize the mechanical stress applied to coiled magnet wire 22 during thermal cycling. More specifically, electrically-insulative body 24 is preferably formed to have a CTE exceeding approximately 10 parts per million per degree Celsius ("ppm per ° C.") and, more preferably, a CTE between approximately 16 and approximately 23 ppm per ° C. Suitable materials include inorganic cements, and certain low melt glasses (i.e., glasses or glass mixtures having a melting point less than the melting point of anodized aluminum wire), such as leaded borosilicate glasses. As a still more specific example, electrically-insulative inorganic body 24 may be produced from a water-activated, silicate-based cement, such as the sealing cement bearing Product No. 33S and commercially available from the SAUEREISEN® Cements Company, Inc., headquartered in Pittsburgh, Pa.

In embodiments wherein electrically-insulative inorganic body 24 is formed from a material susceptible to water intake, such as a porous inorganic cement, it is desirable to prevent the ingress of water into body 24. As will be described more fully below, electromagnetic coil assembly 10 may further include a container, such as a generally cylindrical canister, in which bobbin 12, electrically-insulative body 24, and coiled magnet wire 22 are hermetically sealed. In such cases, the ingress of moisture into the hermetically-sealed container and the subsequent wicking of moisture into electrically-insulative body 24 is unlikely. However, if additional moisture protection is desired, a liquid sealant may be applied over an outer surface of electrically-insulative inorganic body 24 to encapsulate body 24, as indicated in FIG. 1 at 26. Sealants suitable for this purpose include, but are not limited to, waterglass, silicone-based sealants (e.g., ceramic silicone), low melting (e.g., lead borosilicate) glass materials of the type described above. A sol-gel process can be utilized to deposit ceramic materials in particulate form over the outer surface of electrically-insulative inorganic body 24, which may be subsequently heated, allowed to cool, and solidify to form a dense water-impenetrable coating over electrically-insulative inorganic body 24.

To provide electrical connection to the electromagnetic coil embedded within of electrically-insulative inorganic body 24, lead wires are joined to opposing ends of coiled magnet wire 22. As appearing herein, the term "lead wire" denotes a wire coupled between an electromagnetic coil and a lead, such as feedthrough pin provided through the wall of a hermetically-sealed canister. In accordance with embodiments of the present invention, each of the opposing ends of coiled magnet wire 22 is joined to a lead wire by way of a specialized splice connector adapted for joining disparate or dissimilar types of wires. Further illustrating this point, FIG. 1 depicts an terminal segment 28 of coiled magnet wire 22 joined to a neighboring terminal segment 30 of a lead wire 32 (partially shown) by way of a disparate wire splice connector 34. Splice connector 34 is described in more detail below in conjunction with FIGS. 2-4. However, it is useful to note at this juncture that splice connector 34 joins coiled magnet wire 22 to lead wire 34 in a manner that provides solder joints having relatively low electrical resistance and relatively high corrosion resistance. It can be seen in FIG. 1 that disparate wire splice connector 34, and thus terminal segment 28 of coiled magnet wire 22, are embedded or buried within electrically-insulative inorganic body 24. Coiled magnet wire 22 is thus mechanically isolated from bending and pulling forces exerted on the external segments of lead wire 32. As a result, in embodiments wherein coiled magnet wire 22 is produced utilizing a fine gauge magnet wire prone to mechanical fatigue and work hardening, such as a fine gauge aluminum magnet wire, the application of strain and stress to coiled magnet wire 22 is minimized and work hardening of wire 22 is avoided. Although not shown in FIG. 1 for clarity, one or more additional layers of wire coils may also be wound over splice connector 34 in further embodiments to provide additional mechanical support or protection to the splice connector interface. The opposing end portion of coiled magnet wire 22 may likewise be joined to a second lead wire utilizing a similar splice connector (not shown).

Lead wire 32 projects through the outer surface of electrically-insulative inorganic body 24 at an entry/exit point 36. The protruding segment of lead wire 32 will consequently be subject to unavoidable mechanical forces (e.g., bending, twisting, pulling, etc.) at this interface due to manipulation of lead wire 32 during manufacture of electromagnetic coil assembly 10. However, in contrast to coiled magnet wire 22, lead wire 32 is able tolerate these forces without significant mechanical fatigue or work hardening for at least one of three reasons. First, lead wire 32 may be formed from a non-aluminum metal having a mechanical strength exceeding that of aluminum wire, such as stainless steel, silver, or copper. Depending upon the particular metal or alloy from which lead wire 32 is formed, lead wire 32 may also be plated or clad with various metals or alloys to increase electrical conductivity, to enhance crimping properties, and/or to improve oxidation resistance. Suitable plating materials include, but are not limited to, nickel, aluminum, gold, palladium, platinum, and silver. Second, in further embodiments, lead wire 32 may be a single conductor or non-braided wire having a diameter significantly larger than the wire diameter of coiled magnet wire 22; e.g., in certain embodiments, the diameter of lead wire 32 may be approximately 18-24 AWG, while, as previously noted, the wire diameter of coiled magnet wire 22 may be approximately 30-38 AWG or, more generally, less than about 30 AWG. In this case, lead wire 32 may or may not be fabricated from aluminum. Third, in still further embodiments, lead wire 32 assumes the form of a braided wire; i.e., a plurality of filaments or conductors woven into an elongated flexible cylinder or tube. Such a braided wire has an extremely high flexibility and is consequently capable of bending with relative ease to accommodate the physical manipulation of lead wire 32 during production and assembly of electromagnetic coil assembly 10.

Figure 2:
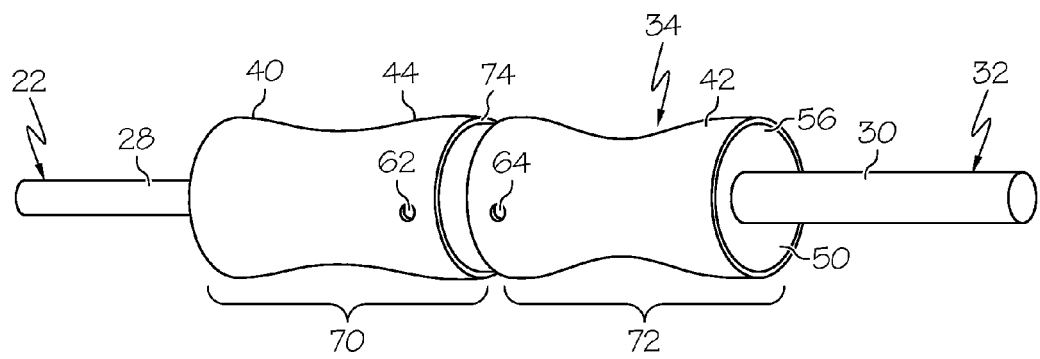
FIGS. 2 and 3 are isometric and cross-sectional views, respectively, of an exemplary disparate wire splice connector included within the electromagnetic coil assembly shown in FIG. 1 and illustrated in a post-solder state.
Figure 3:
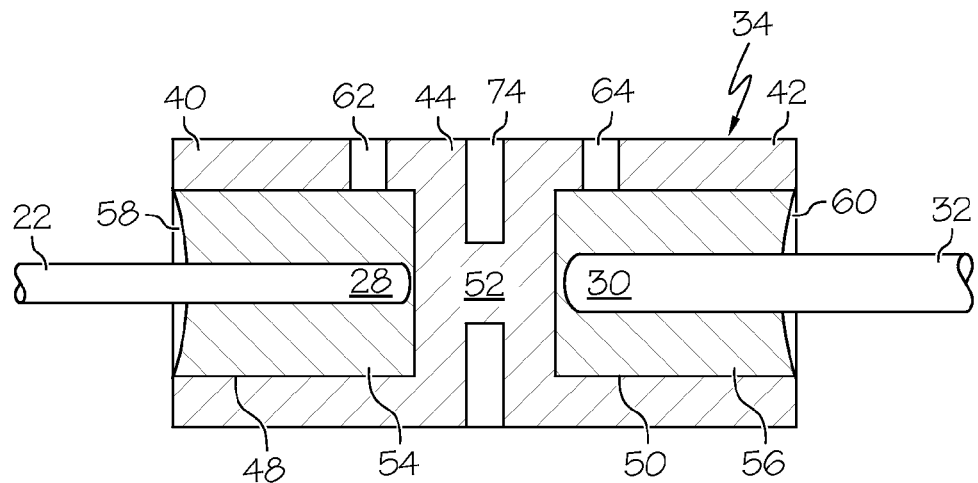
Figure 4:
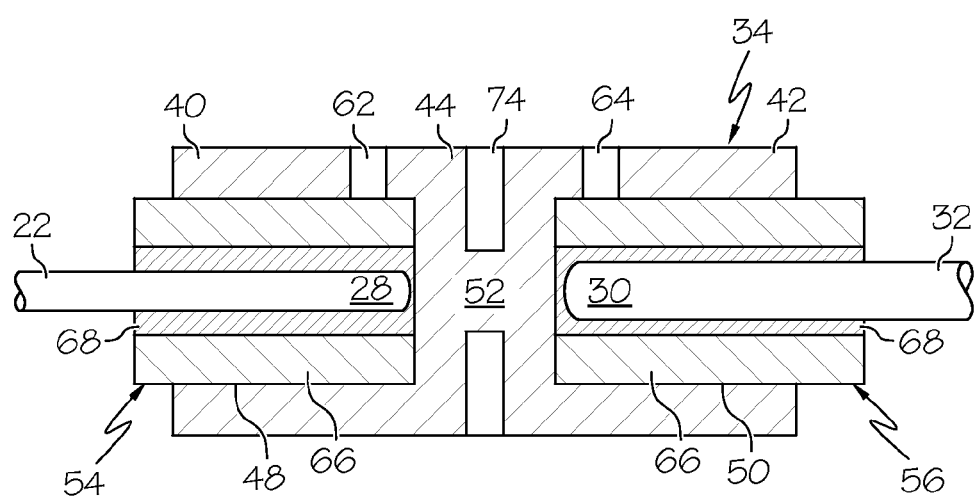
FIG. 4 is a cross-sectional view of the exemplary disparate wire splice connector shown in FIGS. 2 and 3 and illustrated in a pre-solder state.

FIGS. 2 and 3 are isometric and cross-sectional views, respectively, illustrating disparate wire splice connector 34, terminal segment 28 of coiled magnet wire 22, and terminal segment 30 of a lead wire 32 in greater detail. In the exemplary embodiment illustrated in FIGS. 2 and 3, splice connector 34 includes a generally cylindrical body having a first end portion 40, a second end portion 42 opposite first end portion 40, and a central or intermediate portion 44 between end opposing portions 40 and 42. As shown most clearly in FIG. 3, a first blind bore 48 is formed in first end portion 42, and a second blind bore 50 is formed in second end portion 44. As appearing herein, the phrase "blind bore" denotes a tunnel, hole, cavity, or the like having a closed or substantially closed terminal end regardless of the manner in which the blind bore is formed. First blind bore 48 and second blind bore 50 converge inwardly toward intermediate portion 44 of splice connector 34. In the illustrated example, blind bore 48 and 50 are substantially co-axial and have ssubstantially cylindrical inner geometries and substantially equivalent inner diameters. In further embodiments, blind bores 48 and 50 may have varying geometries and/or dimensions, which may be tailored based upon unique the physical characteristics of coiled magnet wire 22 and lead wire 32. Splice connector 34 is preferably fabricated from a metal or alloy, such as brass, aluminum, stainless steel, or the like. Splice connector 34 may be plated with gold or another material in certain embodiments to increase electrical conductivity, to enhance crimping properties, and/or to improve oxidation resistance, as desired. In one specific example, splice connector 34 is a machined brass component having a gold plating, coiled magnet wire 22 is an aluminum wire, and lead wire 32 is a copper wire.

First and second solder materials 54 and 56 are disposed within blind bores 48 and 50, respectively. In FIGS. 2 and 3, splice connector 34 is illustrated after soldering and, thus, solder materials 54 and 56 are illustrated in a post-flow state. A partitioning wall 52 (FIG. 3) separates blind bores 48 and 50 and serves as a solder dam to prevent intermixing of solder materials 54 and 56, as described below. Solder material 54 electrically and, to a certain extent, mechanically couples terminal segment 28 of coiled magnet wire 22 to splice connector 34. Similarly, solder material 56 electrically and mechanically bonds terminal segment 30 of lead wire 32 to splice connector 34 and, therefore, to magnet wire 22. As indicated in FIGS. 2 and 3, a sufficient volume of solder material 54 is preferably disposed within blind bore 48 to fill the majority, and preferably the substantial entirety, of bore 48 and create a meniscus 58 (FIG. 3) near the open end thereof. A sufficient volume of solder material 56 is likewise disposed within blind bore 50 to fill the majority, and preferably the entirety, of bore 50 and form a meniscus 60 (FIG. 3) near the mouth thereof. By substantially filling bores 48 and 50 with solder material, the interior surface area of splice connector 34 mechanically and electrically bonded to the exterior surface area of wires 22 and 32 can be maximized to optimize the mechanical and electrical coupling between coiled magnet wire 22, lead wire 32, and disparate wire splice connector 34.

To decrease electrical resistance across the solder interface, it is desired to minimize voiding or the presence of pocketed gases within post-flow solder materials 54 and 56. To a certain extent, gasses initially trapped within solder materials 54 and 56 prior to soldering will be released during the soldering process as solder materials 54 and 56 are drawn into their respective blind bores 48 and 50 by capillary action. To further promote the inward wicking of solder materials 54 and 56, and to allow the release of trapped gases from within blind bores 48 and 50, one or more weep holes may be formed in disparate wire splice connector 34. For example, as shown in FIGS. 2 and 3, a first weep hole 62 may be formed through the annular sidewall of splice connector 34 to fluidly couple the closed terminal end of blind bore 48 to ambient and thereby allow the outflow of trapped gas during soldering; and a second weep hole 64 may likewise be formed through the annular sidewall of splice connector 34 to fluidly couple the closed terminal end of blind bore 50 to the ambient environment.

Solder materials 54 and 56 may have any formulation suitable for bonding coiled magnet wire 22 and lead wire 32 to splice connector 34, respectively. In general, solder materials 54 and 56 will be formulated based, at least in part, on metallurgical compatibility with the metals and/or alloys from which magnet wire 22, lead wire 32, and splice connector 34 are fabricated. In embodiments wherein coiled magnet wire 22 and lead wire 32 are each fabricated from aluminum, the composition of solder materials 54 and 56 may be identical or similar. By contrast, in embodiments wherein one or both of coiled magnet wire 22 and lead wire 32 are fabricated from a non-aluminum metal or metals, solder materials 54 and 56 may be specifically formulated for compatibility with the non-aluminum metal or metals and with the material from which splice connector 34 is fabricated. In preferred embodiments wherein at least coiled magnet wire 22 is fabricated from either aluminum or silver, solder material 54 may be formulated for usage in conjunction with aluminum or silver wire, respectively, and the material from which splice connector 34 is fabricated. As solder intermixing is prevented by partitioning wall 52, the composition of solder materials 54 and 56 can be specifically tailored to provide optimal metallurgical compatibility with wires 22 and 32. Solder materials 54 and 56 are also chosen to have a melt point less than that of coiled magnet wire 22.

Although by no means required, solder materials 54 and 56 will each typically include a braze component and a flux component. In preferred embodiments, solder materials 54 and 56 are pre-loaded or pre-inserted into blind bores 48 and 50, respectively, to facilitate subsequent soldering. For example, in on implementation, the constituents of solder materials 54 and 56 (e.g., the braze component and the flux component) may be combined to form a mixture, which is then molded into a cylindrical or annular body and press-fit into blind bores 48 and 50. Alternatively, the braze component and flux component may be disposed within blind bores 48 and 50 as discrete bodies or volumes of material, which intermix during the solder process. This may be more fully appreciated by referring to FIG. 4, which solder materials 54 and 56 prior to soldering in accordance with one possible and non-limiting implementation. In this case, solder materials 54 and 56 each include an annular braze insert 66, which has been molded and matingly inserted (e.g., press-fit) into blind bores 48 and 50. The annular braze insert may be produced from a braze rod, which is machined to fit the inner diameter of the blind bore or hole. Notably, such an annular braze insert helps to ensure proper wetting of the wire and connector surfaces before significant oxidation can occur during soldering. As further shown in FIGS. 2 and 3, the interior of each braze insert 66 has further been packed with a flux powder 68. Immediately prior to soldering, end portions 28 and 30 of wires 22 and 32 are inserted into flux powders 68 packed into blind bores 48 and 50, respectively. The entire assembly is then heated, in either a uniform or non-uniform manner (described below), to flow the solder material and yield the finished solder connection shown in FIGS. 2 and 3. Due to shrinkage of the solder material during soldering, each annular braze insert 66 may have a length exceeding the bore depth such that the insert 66 projects outward from the bore opening (shown in FIG. 4) to ensure that a sufficient volume of solder material is provided to fill the bore during the soldering process.

It is desired that clamping or frictional forces are applied to terminal segments 28 and 30 to physically retain wires 22 and 32 in place prior to and during soldering. In embodiments wherein the solder materials are relatively soft in their pre-flowed state, this may be accomplished by utilizing cylindrical solder material inserts and manually pressing the wire ends into the solder inserts immediately prior to soldering. Alternatively, holes may be drilled or otherwise formed in each solder insert prior to wire insertion. In this case, each hole may be formed to have an inner diameter generally conformal with (e.g., slightly greater than) the outer diameter of the wire to be inserted therein. To further help retain the wires in place during soldering and to provide additional mechanical strength to the finished solder joint, opposing ends 40 and 42 of splice connector 34 may also be crimped to exert a circumferential clamping force on wires 22 and 32, respectively, through solder materials 54 and 56. For example, as shown in FIG. 3, end portion 40 of splice connector 34 may be crimped over terminal segment 28 of magnet wire 22 (indicated in FIG. 3 at 70), while end portion 42 of splice connector may be crimped over terminal segment 30 of lead wire 32 (indicated in FIG. 3 at 72). Crimping may be performed such that first end portion 40 of splice connector 34 is less severely deformed than is second end portion 42 of splice connector 34 to minimize the clamping force applied to magnet wire 22. When crimped in this manner, splice connector 34 is imparted with a double-concave crimped profile, as viewed from the side, wherein end portion 40 and end portion 42 are inwardly deformed, while intermediate portion 44 remains uncrimped. Such a crimp may be achieved in a single step process utilizing a specialized crimping tool having two double convex platens or jaws (not shown), which converge to contact and simultaneously exert an inward deformation force on end portions 40 and 42 of splice connector 34.

Soldering may be performed in any manner wherein solder materials 54 and 56 are heated to temperatures beyond their respective melting points, while magnet wire 22 is maintained below its melting point. In a first exemplary technique, the entire assembly may be placed within an oven or furnace and uniformly heated to a temperature that is greater than the melting points of the solder materials and less than the melting point of magnet wire 22. In this case, the oven may be purged with an inert gas, such as argon, to reduce the formation of oxides on the wire and splice connector surfaces during heating. In a second technique, splice connector 34 may be exposed to an open flame utilizing, for example, a microtorch to bring solder materials 54 and 56 to their respective melting points. In this case, opposing end portions 40 and 42 of splice connector 34 may be heated unevenly to minimize heat transfer to end portion 40 of splice connector 34 to prevent overheating of magnet wire 22. Disparate heating may be achieved by varying the proximity and/or duration of flame exposure. In addition, heat transfer to end portion 40 of splice connector 34 may be reduced by fabricating splice connector 34 to include a reduced cross-sectional area, and therefore a reduced thermal conductivity, when moving from end portion 42 to end portion 40. For example, as indicated in FIGS. 1-4, an annular groove 74 may be cut around intermediate portion 44 of splice connector 34. To still further reduce the heating of end portion 40 and wire 22, end portion 40 may be placed in contact with a heat sink and/or actively cooled by, for example, exposure to forced airflow during the soldering process.

Splice connector 34 may be produced from utilizing a wide variety of manufacturing process. In one exemplary and non-limiting manufacturing process, an elongated metal cylinder (e.g., a brass rod) may first be cut or sectioned into a series of cylindrical blanks Drilling may then be performed to remove material from the opposing ends of each blank and thereby create opposing blind bores 48 and 50. Additional machining may then be performed to create the other structural features of splice connector 32 and/or to fine-tune critical dimensions; e.g., weep holes 62 and 64 may be formed utilizing a drill press, and annular groove 67 may be formed within intermediate portion 44 utilizing a cutting tool. If desired, splice connector 34 may then be plated with gold or another plating material. Finally, braze inserts (e.g., inserts 66 shown in FIG. 4) may be press-fit or otherwise installed within blind bores 48 and 50 to finish production of splice connector 34.

Figure 5:
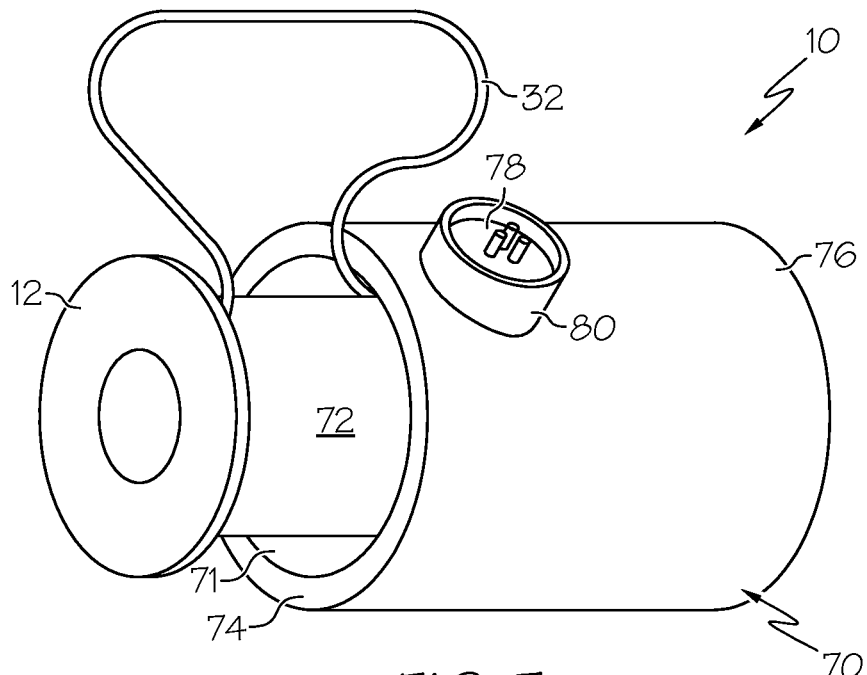
FIGS. 5 and 6 are simplified isometric views illustrating one manner in which the electromagnetic coil assembly shown in FIG. 1 may be sealed within a hermetic canister.

After the above-described soldering process is complete, and after formation of inorganic dielectric body 24 (FIG. 1) encapsulating coiled magnet wire 22 and splice connector 34, bobbin 12 and the potted coil (i.e., magnet wire 22 and dielectric body 24) and may be installed within a sealed canister. For example, and with reference to FIG. 5, electromagnetic coil assembly 10 further includes a canister 80 having a cavity 82 into which bobbin 12 and the potted coil 84 are inserted. Canister 80 assumes the form of a generally tubular casing having an open end 86 and an opposing closed end 88. The cavity of canister 80 may be generally conformal with the geometry and dimensions of bobbin 12 such that, when fully inserted into canister 80, the trailing flange of bobbin 12 effectively plugs or covers open end 86 of canister 80, as described below in conjunction with FIG. 6. At least one feedthrough connector 90 is mounted through a wall of canister 80 to enable electrical connection to potted coil 84 while bridging the hermetically-sealed environment within canister 80. For example, as shown in FIG. 5, feedthrough connector 90 may be mounted within a tubular chimney structure 92, which extends through the annular sidewall of canister 80. Feedthrough connector 90 includes a plurality of conductive terminal pins, which extend through a glass body, a ceramic body, or other insulating structure. In the illustrated example, feedthrough connector 90 includes three pins; however, the number of pins included within the feedthrough assembly, as well as the particular feedthrough assembly design, will vary in conjunction with the number of required electrical connections and other design parameters of electromagnetic coil assembly 10. In further embodiments, feedthrough connector 90 may assume the form of a mineral-insulated cable, including a metal tube containing two or more non-insulated or bare metal wires fabricated from one or more metals or alloys (e.g., stainless steel-clad copper wires) and prevented from contacting within the metal tube by a dielectric packing (e.g., a tightly-packed, inorganic powder). Various other types of feedthrough structures can also be employed. Regardless of the particular feedthrough structure employed, embodiments of the splice connectors described herein can be utilized to join the magnet wire or wires directly to the conductors of the feedthrough structure (e.g., the wires of a mineral-insulated cable) or to one or more intermediate conductors or lead wires, which are, in turn, joined to the conductors of the feedthrough structure.

Figure 6:
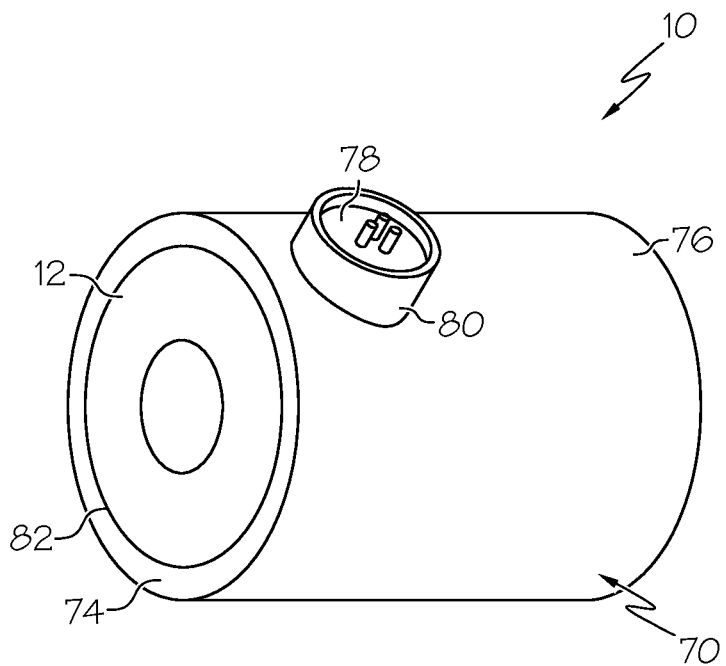

FIG. 6 is an isometric view of electromagnetic coil assembly 10 in a fully assembled state. As can be seen, bobbin 12 and potted coil 84 (identified in FIG. 5) have been fully inserted into canister 80 such that the trailing flange of bobbin 12 has effectively plugged or covered open end 86 of canister 80. In certain embodiments, the empty space within canister 80 may be filled or potted after insertion of bobbin 12 and potted coil 84 (FIG. 5) with a suitable potting material. Suitable potting materials include, but are by no means limited to, high temperature silicone sealants (e.g., ceramic silicones), inorganic cements of the type described above, and ceramic powders (e.g., alumina or zirconia powders). In the case wherein potted coil 84 is further potted within canister 80 utilizing a powder or other such filler material, vibration may be utilized to complete filling of any voids present in the canister with the powder filler. In certain embodiments, potted coil 84 may be inserted into canister 80, the free space within canister 80 may then be filled with a potting powder or powders, and then a small amount of dilute cement may be added to loosely blind the powder within canister 80. A circumferential weld or seal 94 has been formed along the annular interface defined by the trailing flange of bobbin 12 and open end 86 of canister 80 to hermetically seal canister 80 and thus complete assembly of electromagnetic coil assembly 10. Electromagnetic coil assembly 10 may then be integrated into a coiled-wire device. In the illustrated example wherein electromagnetic coil assembly 10 includes a single wire coil, assembly 10 may be included within a solenoid. In alternative embodiments wherein electromagnetic coil assembly 10 is fabricated to include primary and secondary wire coils, assembly 10 may be integrated into a linear variable differential transducer or other sensor. Due at least in part to the inorganic composition of potted dielectric body 24, electromagnetic coil assembly 10 is well-suited for usage within avionic applications and other high temperature applications.

The foregoing has thus provided embodiments of an electromagnetic coil assembly suitable for usage within high temperature coiled-wire devices (e.g., solenoids, linear variable differential transformers, and three wire position sensors, to list but a few) wherein mechanical stress and work hardening of magnet wire is reliably avoided during manufacture. In particular, a magnet wire, such as a fine gauge aluminum wire or silver wire, is soldered to a larger diameter wire or a weave or braid of several conductors utilizing a specialized splice connector to alleviate issues associated with work hardening leading that may otherwise result in breakage or resistance hot spot failure. A specialized disparate wire splice connector is utilized to create this solder connection, while ensuring that the magnet wire is not overheated and destroyed during the soldering process, especially when fabricated from aluminum. In preferred embodiments, the splice connector is buried or embedded within an inorganic electrically-insulative body to mechanical isolate the fine gauge magnet wire from bending forces occurring during production and assembly of the electromagnetic coil assembly. Embodiments of the electromagnetic coil assembly described above are capable of providing prolonged and reliable operation in high temperature environments characterized by temperatures exceeding approximately 400° C.

While described above in conjunction with an electromagnetic coil assembly, it is emphasized that embodiments of the disparate wire splice connector can be utilized in various other applications wherein a magnet wire, such as a fine gauge aluminum or silver magnet wire, is joined to a secondary wire, which is fabricated from one or more metals having a greater resistance to work hardening and mechanical fatigue as compared to the magnet wire, which has a larger diameter (smaller gauge) than does the magnet wire, and/or is a braided wire comprised of a plurality of interwoven conductive filaments. In this regard, the foregoing has provided embodiments of a disparate wire splice connector including a generally cylindrical body, a first blind bore formed within a first end portion of the generally cylindrical body, and a second blind bore formed within a second end portion of the generally cylindrical body. A partitioning wall separates the first blind bore and the second blind bore, and a solder material is disposed within the first blind bore and formulated for usage in conjunction with the magnet wire.

The foregoing has also further provided embodiments of a method for joining an magnet wire, such as a coiled aluminum or silver magnet wire, to a secondary wire, such as a lead wire. In one embodiment, the method includes the steps of providing a splice connector having a first blind bore and a second blind bore, inserting a segment (e.g., an end portion) of the magnet wire into the first blind bore, and inserting a segment (e.g., an end portion) of the secondary wire into the second blind bore. The magnet wire is preferably fabricated from aluminum or silver. The splice connector is then soldered to the segments of the magnet wire and the secondary wire inserted into the first and second blind bores, respectively, to electrically couple the magnet wire and the secondary wire through the splice connector. In certain embodiments, solder material is disposed along with flux within the first blind bore and formulated for usage in conjunction with the magnet wire. The solder material may be inserted into the blind bore as, for example, an annular body having a hollow center with an inner diameter slightly larger than the wire diameter. The solder material can protrude from the body enough to allow for shrinkage upon melting. The gap between the solder material and wire is preferably large enough to allow for the application of flux to the wire prior to insertion. Prior to application of the flux, the surface of the magnet wire should ideally be free of any oxide. The second blind bore is treated in a similar manner allowing for a different wire size and material type, as appropriate.

In certain embodiments described above, solder material was disposed along with flux within the first blind bore and formulated for usage in conjunction with the metal or metals from which the magnet wire is fabricated. The solder material may be inserted into the blind bore, as for example, an annular body having a hollow center with an inner diameter slightly larger than the wire diameter. Additionally, the solder material can protrude from the body enough to allow for shrinkage upon melting. The gap between the solder material and wire is preferably large enough to allow for the application of flux to the wire prior to insertion. Prior to application of the flux, the surface of the magnet wire should ideally be free of any oxide. The second blind bore is treated in a similar manner allowing for a different wire size and material type, as appropriate.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An electromagnetic coil assembly comprising:
   a disparate wire splice connector having a first blind bore and a second blind bore;
   a coiled magnet wire having a segment inserted into the first blind bore and soldered to the disparate wire splice connector;
   a secondary wire having a segment inserted into the second blind bore and soldered to the disparate wire splice connector such that the secondary wire is electrically coupled to the coiled magnet wire through the disparate wire splice connector; and
   a body of electrically-insulative material surrounding at least a portion of the coiled magnet wire, the disparate wire splice connector buried within the body of electrically-insulative material.

2. An electromagnetic coil assembly according to claim 1 further comprising a hermetically-sealed canister in which the body of insulative material, the coiled magnet wire, and the disparate wire splice connector are disposed.

3. An electromagnetic coil assembly according to claim 2 further comprising a feedthrough connector disposed through a wall of the hermetically-sealed canister and having at least one conductor to which the coiled magnet wire is electrically coupled via the disparate wire splice connector.

4. An electromagnetic coil assembly according to claim 1 wherein disparate wire splice connector comprises first and second end portions in which the first and second blind bores are formed.

5. An electromagnetic coil assembly according to claim 4 wherein at least one of the first and second end portions of the disparate wire splice connector is crimped over the segment of the coiled magnet wire and the segment of the secondary wire, inserted into the first and second blind bores, respectively.

6. An electromagnetic coil assembly according to claim 1 wherein the secondary wire has a diameter greater than the diameter of the coiled magnet wire.

7. An electromagnetic coil assembly according to claim 1 wherein the coiled magnet wire is selected from the group consisting of coiled aluminum magnet wire and coiled silver magnet wire.

8. An electromagnetic coil assembly according to claim 1 wherein the secondary wire comprises a non-aluminum metal.

9. An electromagnetic coil assembly according to claim 8 wherein the secondary wire comprises copper.

10. An electromagnetic coil assembly according to claim 1 wherein the secondary wire comprises a wire braid.

11. An electromagnetic coil assembly according to claim 1 wherein the disparate wire splice connector further comprises a weep hole formed in an annular sidewall of the splice connector and extending to the first blind bore.

12. An electromagnetic coil assembly according to claim 1 further comprising a circumferential groove formed around at least a portion of an intermediate section of the disparate wire splice connector.

13. An electromagnetic coil assembly, comprising:
    a coiled magnet wire;
    a secondary wire;
    a disparate wire splice connector, comprising:
        a first blind bore into which a segment of the coiled magnet wire is inserted; and
        a second blind bore into which a segment of the secondary wire is inserted;
    a first solder material filling at least a portion of the first blind bore and electrically coupling the coiled magnet wire to the disparate wire splice connector; and
    a second solder material filling at least a portion of the second blind bore and electrically coupling the secondary wire to the disparate splice connector and to the coiled magnet wire.

14. An electromagnetic coil assembly according to claim 13 further comprising an inorganic dielectric material encapsulating at least a portion of the coiled magnet wire, the disparate wire splice connector at least partially embedded in the inorganic dielectric material.

15. An electromagnetic coil assembly according to claim 13 wherein the coiled magnet wire comprises at least one of the group consisting of aluminum and silver.

16. An electromagnetic coil assembly according to claim 13 further comprising:
    a sealed canister in which the coiled magnet wire, the disparate wire splice connector, and at least a portion of the secondary wire are disposed; and
    a feedthrough connector disposed through the sealed canister and electrically coupled to the coiled magnet wire through the disparate wire splice connector.

17. An electromagnetic coil assembly according to claim 13 wherein the disparate wire splice connector further comprises a partition wall separating the first and second blind bores and preventing intermixing of the first and second solder material during reflow thereof.

18. An electromagnetic coil assembly according to claim 13 wherein the coiled magnet wire comprises a first metal, wherein the secondary wire comprises a second metal different than the first metal, wherein the first solder material is formulated for compatibility with the first metal, and wherein the second solder material is formulated for compatibility with the second metal.

19. An electromagnetic coil assembly according to claim 13 wherein the coiled magnet wire comprises one of the group consisting of aluminum magnet wire and silver magnet wire.

20. An electromagnetic coil assembly, comprising:
    a disparate wire splice connector having a first blind bore, a second blind bore, a sidewall, and weep holes formed in the sidewall of the splice connector and extending to the first and second blind bores;
    a coiled magnet wire having a segment inserted into the first blind bore and soldered to the disparate wire splice connector; and
    a secondary wire having a segment inserted into the second blind bore and soldered to the disparate wire splice connector such that the secondary wire is electrically coupled to the coiled magnet wire through the disparate wire splice connector.

* * * * *